US011366317B2

United States Patent

Blomstedt et al.

(10) Patent No.: US 11,366,317 B2
(45) Date of Patent: Jun. 21, 2022

(54) MULTIPUPIL WAVEGUIDE DISPLAY ELEMENT AND DISPLAY DEVICE

(71) Applicant: DISPELIX OY, Espoo (FI)

(72) Inventors: Kasimir Blomstedt, Espoo (FI); Juuso Olkkonen, Espoo (FI); Mika Aikio, Espoo (FI)

(73) Assignee: DISPELIX OY, Espoo (FI)

( * ) Notice: Subject to any disclaimer, the term of this patent is extended or adjusted under 35 U.S.C. 154(b) by 0 days.

(21) Appl. No.: 16/954,911

(22) PCT Filed: Dec. 14, 2018

(86) PCT No.: PCT/FI2018/050919
§ 371 (c)(1),
(2) Date: Jun. 17, 2020

(87) PCT Pub. No.: WO2019/122513
PCT Pub. Date: Jun. 27, 2019

(65) Prior Publication Data

US 2020/0393674 A1 Dec. 17, 2020

(30) Foreign Application Priority Data

Dec. 22, 2017 (FI) ..................................... 20176162

(51) Int. Cl.
*G02B 27/01* (2006.01)
*F21V 8/00* (2006.01)

(52) U.S. Cl.
CPC ....... *G02B 27/0101* (2013.01); *G02B 6/0016* (2013.01); *G02B 6/0035* (2013.01);
(Continued)

(58) Field of Classification Search
CPC .................................................. G02B 27/0101
See application file for complete search history.

(56) References Cited

U.S. PATENT DOCUMENTS 7,206,107 B2 4/2007 Levola
9,784,970 B2 10/2017 Charle et al.
(Continued)

FOREIGN PATENT DOCUMENTS

CN 101103299 A 1/2008
CN 102033319 A 4/2011
(Continued)

OTHER PUBLICATIONS

Finnish Search Report dated May 16, 2018 as received in application No. 20176162.
(Continued)

*Primary Examiner* — Tina M Wong
(74) *Attorney, Agent, or Firm* — Maschoff Brennan

(57) ABSTRACT

The invention relates to a waveguide display element comprising a waveguide comprising at least three waveguide layers stacked on top of each other. There is also provided diffractive in-coupling gratings associated with each waveguide layer and being displaced with respect to each other in the plane of the layers, the in-coupling gratings forming input pupils for different light wavelength ranges coupled to the waveguide, and a diffractive out-coupling means for coupling light in-coupled through the pupils and propagating in the layers out of the waveguide such that a polychromatic image is formed. The invention also concerns a personal display device comprising such element.

19 Claims, 4 Drawing Sheets

(52) U.S. Cl.
CPC ...... *G02B 6/0076* (2013.01); *G02B 2027/011* (2013.01); *G02B 2027/0112* (2013.01)

(56) References Cited

U.S. PATENT DOCUMENTS

| | | | | |
|---|---|---|---|---|
| 10,088,633 | B2 | 10/2018 | Mason | |
| 10,386,642 | B2 | 8/2019 | Piskunov et al. | |
| 10,409,059 | B2 | 9/2019 | Mason | |
| 2004/0174348 | A1 | 9/2004 | David | |
| 2011/0019258 | A1 | 1/2011 | Levola | |
| 2011/0242661 | A1 | 10/2011 | Simmonds | |
| 2016/0077338 | A1 | 3/2016 | Robbins et al. | |
| 2016/0286204 | A1 | 9/2016 | Grata et al. | |
| 2016/0327789 | A1 | 11/2016 | Klug | |
| 2017/0248750 | A1 | 8/2017 | Curtis | |
| 2017/0248790 | A1 | 8/2017 | Cheng | |
| 2017/0255016 | A1 | 9/2017 | Tinch | |
| 2018/0011237 | A1 | 1/2018 | Fattal | |
| 2019/0155034 | A1 | 5/2019 | Singer et al. | |
| 2020/0393674 | A1* | 12/2020 | Blomstedt | G02B 6/0016 |
| 2021/0088798 | A1* | 3/2021 | Blomstedt | G02B 6/0026 |

FOREIGN PATENT DOCUMENTS

| | | | |
|---|---|---|---|
| CN | 103207458 | A | 7/2013 |
| CN | 103620478 | A | 3/2014 |
| CN | 103959133 | A | 7/2014 |
| CN | 104090372 | A | 10/2014 |
| CN | 105892052 | A | 8/2016 |
| CN | 106471428 | A | 3/2017 |
| CN | 106716226 | A | 5/2017 |
| CN | 107110479 | A | 8/2017 |
| CN | 107209393 | A | 9/2017 |
| DE | 102015122055 | A1 | 6/2017 |
| EP | 1515173 | A1 | 3/2005 |
| JP | 2012047855 | A | 3/2012 |
| WO | 2006064325 | A1 | 6/2006 |
| WO | 2016109599 | A1 | 7/2016 |
| WO | 2016113533 | A2 | 7/2016 |
| WO | 2017213907 | A1 | 12/2017 |

OTHER PUBLICATIONS

Chinese Office Action dated Jul. 30, 2021 as received in application No. 201880082064.7.

European Search Report dated Jul. 1, 2021 as received in application No. 18891533.

* cited by examiner

MULTIPUPIL WAVEGUIDE DISPLAY ELEMENT AND DISPLAY DEVICE

FIELD OF THE INVENTION

The invention relates to diffractive waveguide displays. In particular, the invention relates to a diffractive waveguide element for a personal display.

BACKGROUND OF THE INVENTION

In known waveguide displays, the waveguide element through which the image to be shown propagates, can be a single-layer or multilayer waveguide. It is known to couple in and convey the whole image, i.e., all wavelengths and full field-of-view (FOV) thereof in a single waveguide. It is also known, for increasing the FOV of the element, to separate the wavelengths of the image to different layers. In that case, each of the layers contains a separate in-coupling grating, which are placed on top of each other, and designed diffract only a specific wavelength range in to the corresponding waveguide layer and to let remaining wavelengths go through to underlying layers. The performance of such system is, however, not optimal in particular with laser-based image projectors.

SUMMARY OF THE INVENTION

It is an aim of the invention to solve at least some of the drawbacks of prior art and to provide a novel diffractive waveguide element and projector therefor.

The invention is based on the idea of separating the in-coupling regions, i.e. input pupils of the waveguide for different wavelengths to different locations of the waveguide. That is, the in-coupling gratings will not overlap each other like in the prior art.

In particular, the invention is characterized by what is stated in the independent claims.

According to one aspect, there is provided a waveguide display element comprising a waveguide comprising at least three waveguide layers stacked on top of each other. There is also provided diffractive in-coupling gratings associated with each waveguide layer and being displaced with respect to each other in the plane of the layers, the in-coupling gratings forming input pupils for different light wavelength ranges coupled to the waveguide, and a diffractive out-coupling means for coupling light in-coupled through the pupils and propagating in the layers out of the waveguide such that a polychromatic image is formed.

According to another aspect, there is provided an image projector for presenting an image on a waveguide plane. The projector may comprise a laser source capable of emitting a polychromatic light beam or a plurality of narrow-wavelength light beams, and a guidance element for directing light emitted by the light source to different pupils of the waveguide plane, the different pupils being displaced with respect to each other in the waveguide plane.

Displaced with respect to each other in the waveguide plane or in the plane of the layers of the waveguide refers to displacement in a direction transverse to the normal of the waveguide (layers).

The laser source and guidance element are adapted to produce at least three narrow-wavelength beams spatially separated on the waveguide plane into the different pupils.

According to still another aspect, there is provided a personal display device comprising a diffractive waveguide element and an image projector of the above kind. The projector is adapted to provide three images using three different wavelength channels on the input pupils of the waveguide.

The invention offers significant benefits. In waveguide structures, where each primary color is propagated in a separate waveguide, light entering the input pupil must be separated accordingly. This means that the in-coupling gratings of the waveguides must be optimized with respect not only to the wavelengths (color) that propagates inside the waveguide, but also to the colors that need to pass through the waveguide. When using narrowband light sources, such as lasers, it thus follows that the narrowband character of the light cannot be fully utilized when optimizing the waveguide functionality. Using a separate in-coupling pupil for each primary color removes this shortcoming as then the primary colors are already separated when entering respective waveguide. Thereby less compromises need to be made in the optimization of the waveguide structures, which results in better overall performance of the system.

Thus, separating the input pupils spatially in the waveguide plane ensures that all colors are coupled to the waveguide with high efficiency and with minimal distortions. Wavelengths proceeding to the farthest layers need not pass in-coupling gratings of other colors, whereby beam splitting and stray waves are completely avoided. Also passing through waveguide layers can be avoided by means of embodiments of the invention, whereby surface reflection and absorption losses are avoided.

The waveguide element is suitable for personal display devices, such as head-mounted displays (HMDs) and head-up displays (HUDs).

The presently disclosed laser projector is ideal for the presently disclosed waveguide element. It can also be implemented in a small space using one or more small laser sources and one or more MEMS mirrors.

Image distortions caused by proposed geometry can be removed by suitable grating design and/or software corrections.

The dependent claims are directed to selected embodiments of the invention.

Next, embodiments of the invention and advantages thereof are discussed in more detail with reference to the attached drawings.

DETAILED DESCRIPTION OF EMBODIMENTS

Figure 1A:
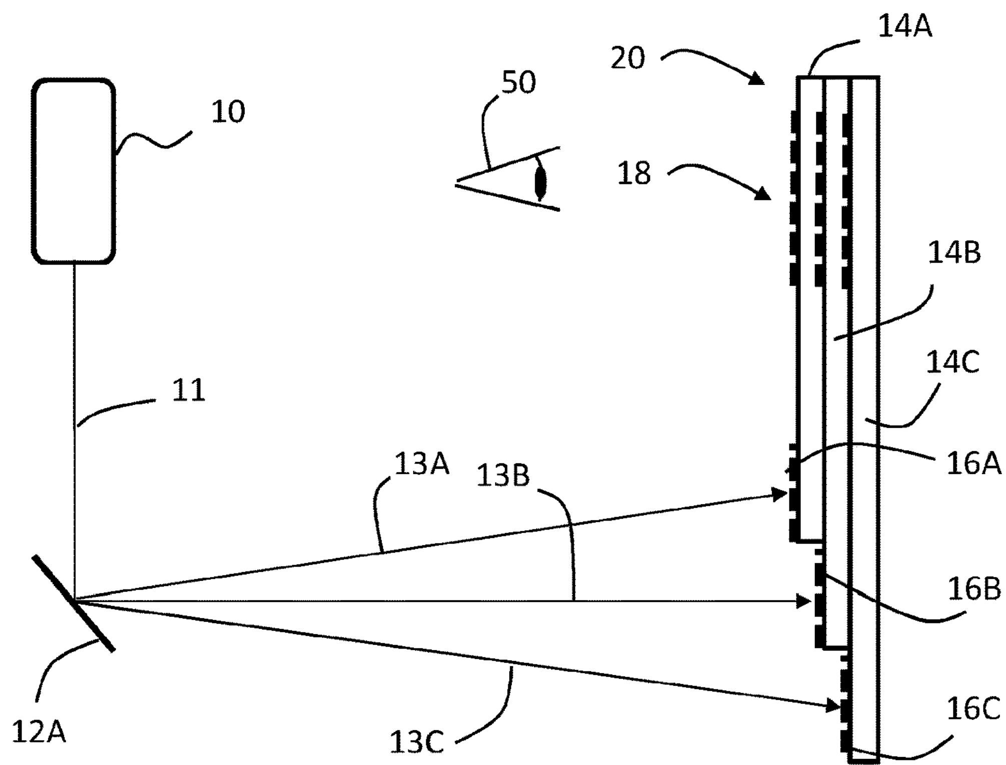
FIGS. 1A-1F show as cross-sectional side views variations of the projector and waveguide according to the invention.

FIG. 1A shows an embodiment having a laser source 10 emitting an initial polychromatic beam 11 containing three wavelengths propagating essentially along the same path. The initial beam 11 hits a mirror 12A containing a diffraction grating thereon. The grated mirror 12A diffracts the different wavelengths in to different angles as monochromatic beams 13A, 13B, 13C. The monochromatic beams 13A, 13B, 13C hit laterally displaced input pupils 16A, 16B, 16C of a waveguide element 20. The element 20 contains three waveguide layers 14A, 14B, 14C stacked on top of each other. The input pupils 16A, 16B, 16C are formed by providing gratings on the surfaces of the layers 14A, 14B, 14C, respectively, the gratings chosen to couple the wavelengths of the beams 13A, 13B, 13C to the layers 14A, 14B, 14C, respectively.

In this example, the layers 14A, 14B, 14C have different coverage such that the beams 13A, 13B, 13C have direct access to the in-coupling gratings.

In the waveguide layers 14A, 14B, 14C the light propagates unless coupled out by the out-coupling arrangement 18, typically comprising a separate out-coupling grating for each layer. The out-coupling gratings are aligned with each other, whereby a polychromatic image is seen by the user 50.

The mirror 12A is preferably a moving microelectromechanical (MEMS) mirror, which is configured to scan the beams 13A, 13B, 13C across the whole image area on the input pupils in synchronization with the output of the laser source 10.

Figure 1B:
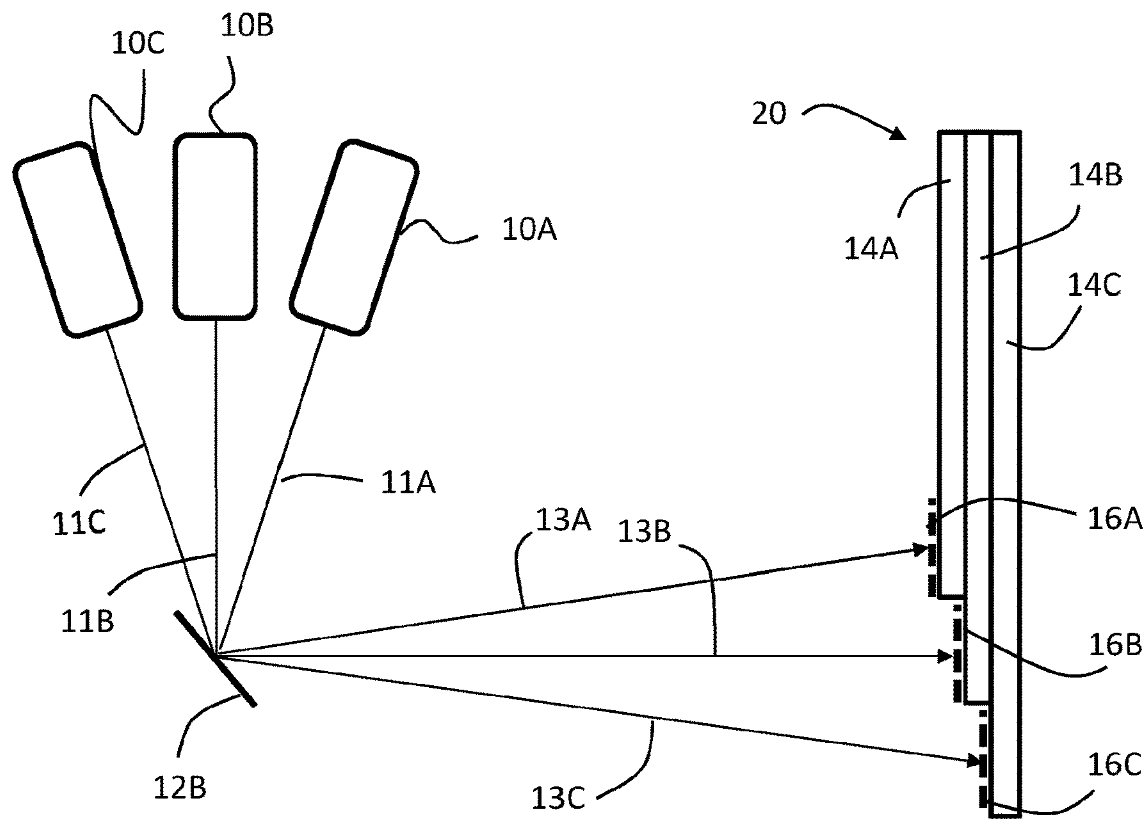

FIG. 1B shows an embodiment, in which the three monochromatic beams 11A, 11B, 110 from separate laser sources 10A, 10B, 10C propagate at different angles towards a mirror 12B. The mirror 12B redirects the beams 13A, 13B, 13C towards the input pupils 16A, 16B, 16C, respectively. In this example, the mirror 12B need not be grated, but for example an ordinary reflective MEMS mirror can be used.

Figure 1C:
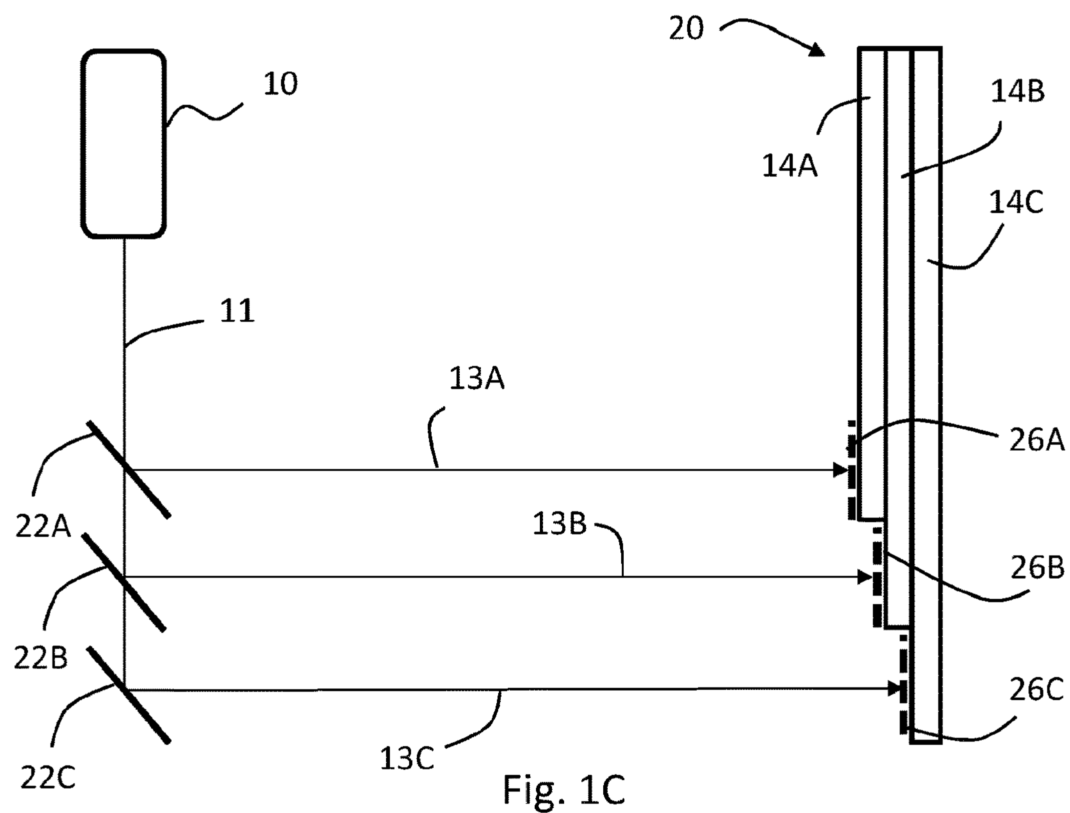

FIG. 1C shows a configuration outside the scope of the claims as concerns beam angles, where a polychromatic light source 10 and three separate mirrors 22A, 22B, 22C are used. The first two mirrors 22A, 22B are partially transmissive, and reflect only selected wavelengths. When the mirrors 22A, 22B, 22C are aligned with the input pupils 26A, 26B, 26C, the reflected beams 13A, 13B, 13C are parallel to each other and meet the in-coupling gratings at the same angle. In particular the center rays of the scanning beams may be arranged to meet the input pupils 26A, 26B, 26C at the right angle.

Also three separate laser source/mirror pairs can be used.

Figure 1D:
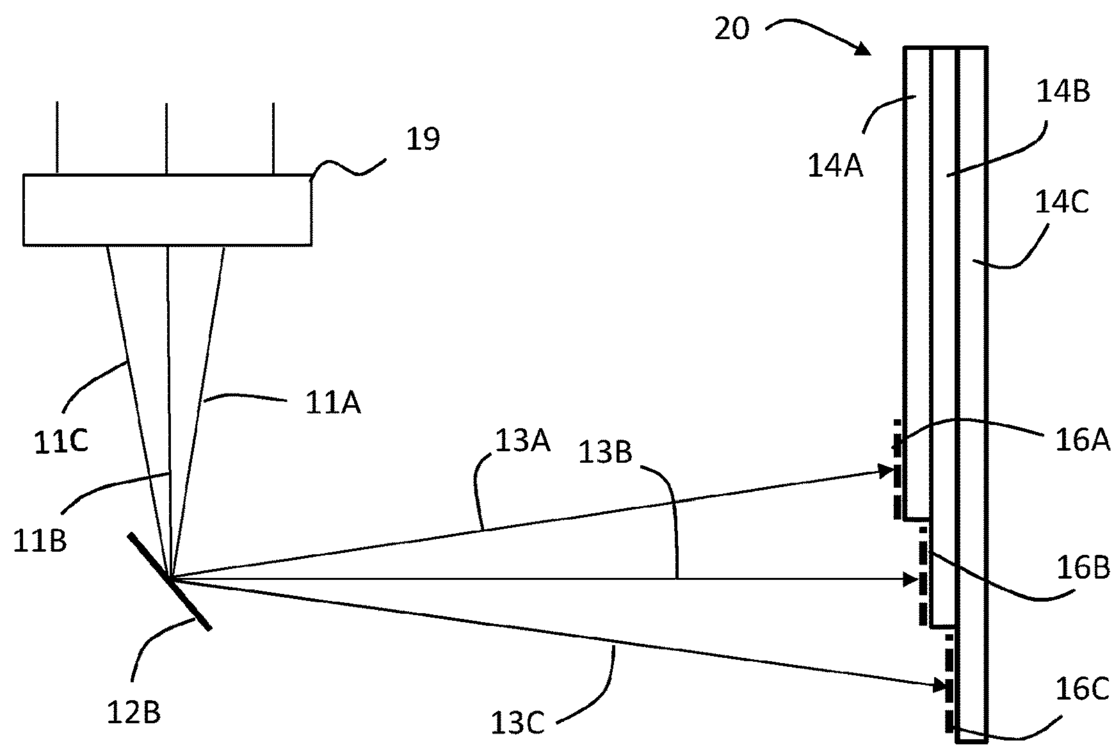

FIG. 1D shows a variation of the setup of FIG. 1B. The three separate laser sources are herein not directly targeted to the mirror 12B, but first to a beam combiner 19 such as a prismatic beam combiner. Contrary to ordinary combiners used in polychromatic laser sources, the output beams 11A, 11B, 110 are not arranged to overlap but targeted to the mirror 12B at different angles.

Figure 1E:
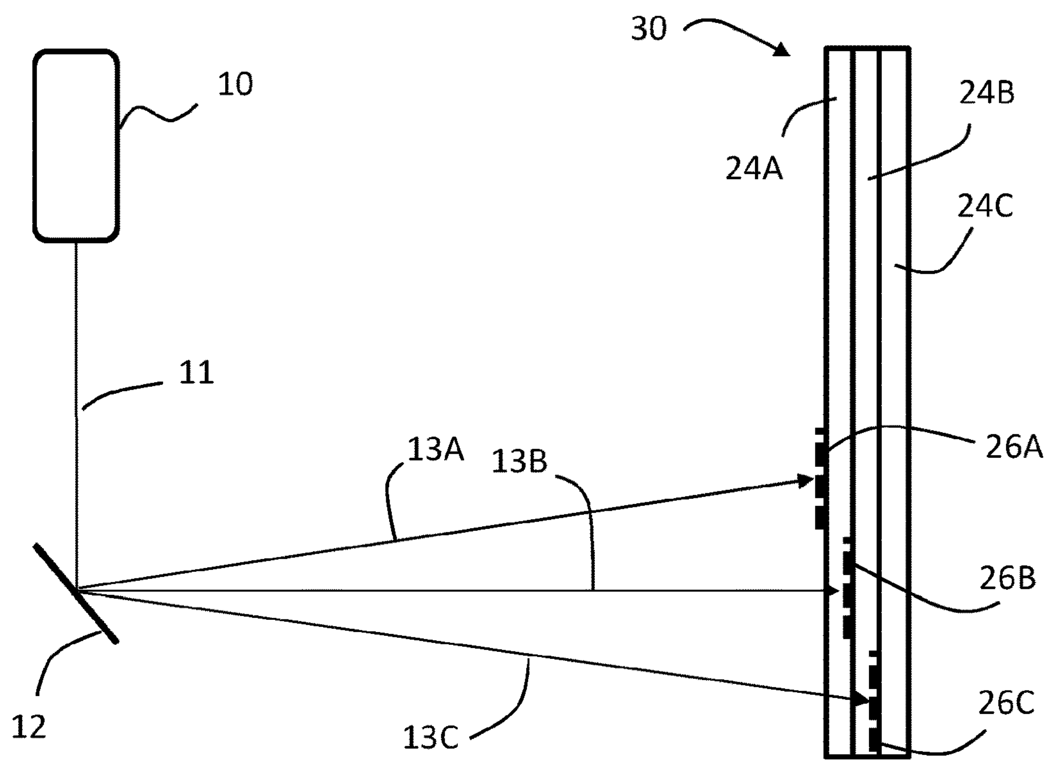

FIG. 1E shows an embodiment, which for the projector part is the same as that of FIG. 1A, but the waveguide 30 comprises three full layers, which overlap at the region of the input pupils 26A, 26B, 26C. The first input pupil 26A is directly accessible by the first beam 13A, but the other incoming beams 13B, 13C pass the waveguide layers 24A, 24A/24B, respectively, remaining on the light path, before hitting the in-coupling gratings of the input pupils 26B, 26C.

Figure 1F:
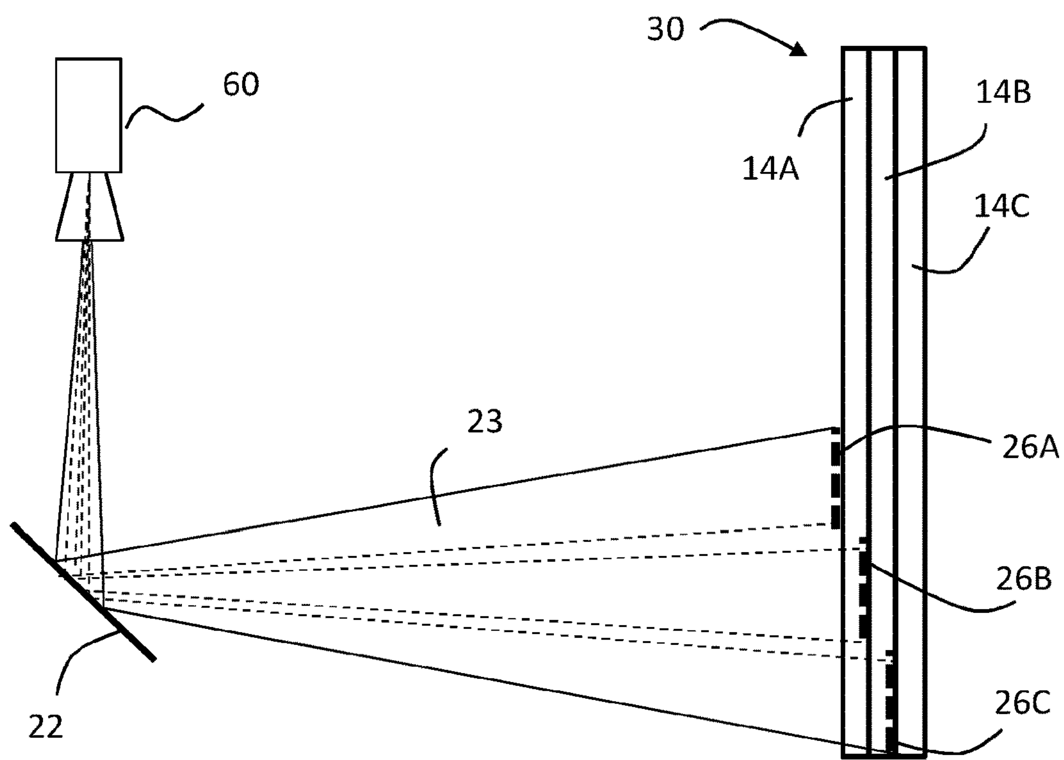

FIG. 1F shows an embodiment in which the projector is not of scanning type and does not require a moving mirror, but a stationary mirror, or there is no mirror at all. The image projector 60 is a wide-area projector capable of presenting the whole image at once. Applied now to the present many-pupil waveguide 30, the projector emits within its field of projection three separate images, corresponding to the waveguide channels chosen, displaced from each other and targeted to the input pupils 26A, 26B, 26C. The mirror 22 is not obligatory, but the projector 60 may be directly targeted at the input pupils 26A, 26B, 26C. Like in the scanning laser examples discussed in more detail above, there may also be separate image sources or projectors for each of the wavelength channels.

The basic setup of FIG. 1F, i.e. targeting different wavelengths to separate sections of a wide-area image cone, can be used also together with scanning projectors, like laser plus MEMS mirror projectors.

Figure 2A:
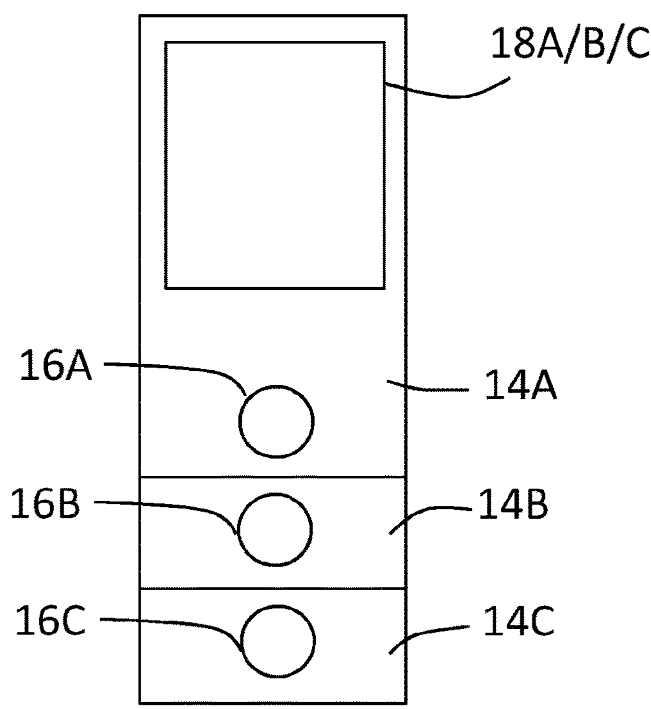
FIGS. 2A and 2B show two alternative input pupil configurations as top views.
Figure 2B:
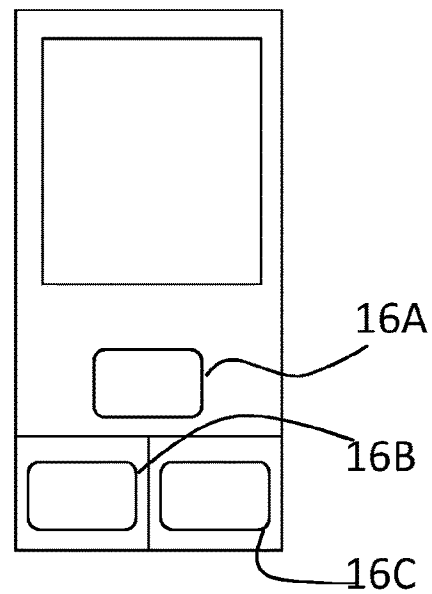

FIGS. 2A and 2B illustrate two alternative positioning schemes for the input pupils 16A, 16B, 16C of the waveguide layers 14A, 14B, 14C, respectively. In FIG. 2A, the pupils are located linearly and in FIG. 2B triangularly. In both cases their grating orientations and/or any intermediate optical elements in the waveguides can be chosen such that light is directed to the out-coupling gratings 18A, 18B, 18C of the layers 14A, 14B, 14C. Other configurations than linear and triangular are possible too.

To exemplify different possibilities, the pupil shape in FIG. 2B is rectangular, as opposed with the circular shape in FIG. 2A. Also, the size of the pupils in the element can be different. This is beneficial e.g. for taking into account the different distance of the pupils from the projector mirror and the broadening of the "light cone" at more distant pupils because of that.

In some embodiment, the pupil shape is projection-angle corrected, for example having the shape of an ellipse or a skewed rectangle.

Figure 3:
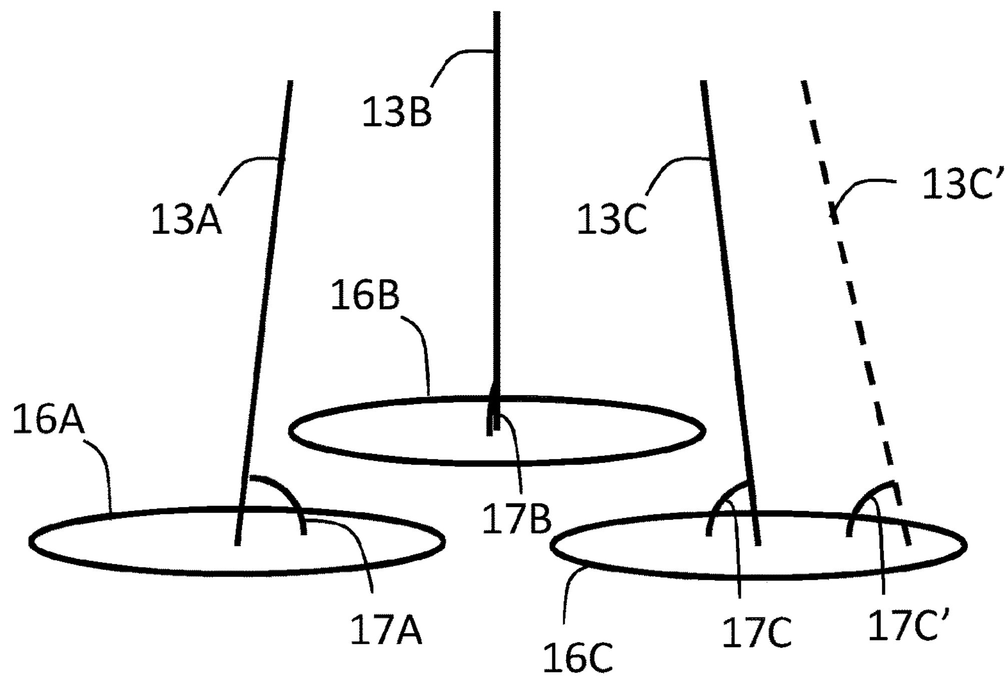
FIG. 3 illustrates in detail one possible illumination scheme of the input pupils.

FIG. 3 illustrates the illumination of the input pupils in the case of embodiments of FIGS. 1A, 1B, 1D, 1E and 1F. The incoming center beams 13A, 13B, 13C arrive at angles 17A, 17B, 17C to the pupils 16A, 16B, 16C, respectively. One of the angles can be a right angle, but at least two of the angles must be different from the right angle. Notably there is an angle between the incoming rays 13A, 13B, 13C in any case. This causes the field-of-view-angles of the center beams of the incoming light being different for each of the input pupils. To compensate for this, the in-coupling gratings of the input pupils 16A, 16B, 16C may be different and configured to correct the FOVs of the in-coupled light so that the integrity of the image out-coupled is maintained.

Another source of distortion is the stretching of the image towards the distal areas of the input pupils, i.e. as the angles get lower during beam scanning (scanning laser projector) or at distal areas of wide-area images (wide-area projector). As an example, a distal ray 13C' with angle 17C' is shown at the input pupil 160. This distortion can be corrected at the projector end, typically as a software correction, by making a corresponding modification to the image to be projected so that the stretching is compensated for.

In the embodiment of FIG. 10, there is no FOV displacement error, i.e. center-ray angles 17A, 17B, 17C are 90 degrees, but the stretching problem (angle 17C') remains in smaller degree and can be corrected in a similar fashion.

Either of the two waveguide element types illustrated can be used together with any of the projector configurations herein discussed.

Next, embodiments of the invention are summarized. The embodiments can be freely combined.

In some embodiments, at least two of the in-coupling gratings are positioned between the waveguide layers, the waveguide layer or layers covering the in-coupling gratings allowing light to pass to the in-coupling gratings. This has the benefit that the element has constant thickness.

In some embodiments, the waveguide layers have different in-plane coverage and each of the in-coupling gratings is located on an outer surface of the element on a surface of the respective waveguide layer. This maximizes the in-coupling efficiency as intervening layers are absent. Different coverage may be implemented by providing different-sized layers and/or providing apertures to topping layers at the location of the input pupils of underlying layers.

The input pupils need not be of the same size and shape.

In some embodiments, the laser source and guidance element are adapted direct the narrow-wavelength beams at different angles to the different input pupils and the in-coupling gratings at the input pupils are configured to in-couple the beams, which arrive at a different central angle for each pupil, and to make a field-of-view displacement correction for the in-coupled light. The correction can be made by appropriate design of the grating microstructure so that effectively the same field-of-view is coupled to the waveguide at each pupil. In some embodiments, the input pupils are located linearly or triangularly with respect to each other in the plane of the waveguide and do not overlap each other.

In some embodiments, each of the in-coupling gratings is different with respect to other in-coupling gratings in terms of grating period and/or grating microstructure profile. This allows for individually optimizing the propagation properties of light. For example, the propagation hop lengths of different wavelengths can be adjusted to be closer to each other compared with the situation if only a single grating was used.

In some embodiments, the laser source is adapted to produce a polychromatic beam and the guidance element is adapted to separate the narrow-wavelength beams from the polychromatic beam. In some embodiments, the guidance element comprises a grated mirror capable of separating the at least three narrow-wavelength beams from a polychromatic beam into different angles towards the waveguide plane.

In some embodiments, the laser source comprises at least three different laser sub-sources adapted to produce at least three initial beams corresponding to the narrow-wavelength beams, the initial beams propagating at different angles onto the guidance element, and the guidance element is further adapted to reflect the initial beams at different angles towards the different regions, respectively. In some embodiments, the sub-sources are laser sources at different locations and angles directed towards the guidance element. In alternative embodiments, the laser source comprises three laser sources and a prismatic coupler adapted to produce the narrow-wavelength beams at different angles towards the guidance element.

In some embodiments, the guidance element comprises one or more microelectromechanical mirrors. In some embodiments, the mirror or mirrors are movable so as to produce a scanning beam onto different locations within the input pupils in order to form the image.

In some embodiments, the different pupils are located linearly or triangularly with respect to each other on the waveguide plane and do not overlap each other.

In some embodiments, the laser image projector is a scanning laser beam projector configured to scan the input pupils with different-wavelength laser beams simultaneously or in interleaved manner. In alternative embodiments, the laser image projector is a large-area projector configured to present different-wavelength sub-images to the input pupils simultaneously.

In some embodiments, each input pupil comprises a diffractive in-coupling grating and the waveguide further comprises a plurality of out-coupling gratings aligned with each other for presenting a polychromatic image for a user.

In some embodiments, there is provided a driver for the projector, the driver comprising software means for correcting image distortions, such as stretch and/or intensity distortions, caused by the spatial separation of the narrow-wavelength beams by the guidance element, in other words the deviations between the distal beams with respect to the center beams.

Embodiments of the invention can be utilized in various personal display devices, augmented reality (AR), virtual reality (VR) and mixed reality (MR) devices, like near-to-the-eye displays (NEDs) and other head-mounted displays (HMDs), as well as head-up displays (HUDs), in their different forms.

Even though not discussed here in detail, the waveguide or individual layers thereof may comprise, in addition to the in-coupling and out-coupling gratings, also other diffractive optical elements, such as exit pupil expander gratings or beam redirection gratings.

The invention claimed is:

1. A personal display device comprising:

an image projector, and a waveguide display element comprising:

a waveguide comprising at least three waveguide layers stacked on top of each other, diffractive in-coupling gratings associated with each waveguide layer and being displaced with respect to each other in the plane of said layers, the in-coupling gratings forming input pupils for different light wavelength ranges coupled to the waveguide, and a diffractive out-coupling means for coupling light in-coupled through said input pupils and propagating in said layers out of the waveguide such that a polychromatic image is formed, wherein the input pupils are configured to in-couple light arriving at different central angles of each input with respect to each other, and the in-coupling gratings of the input pupils are different so as to make a field-of-view displacement correction for the in-coupled light, the image projector is a laser image projector configured to direct different wavelength ranges to the different input pupils at different angles; and the laser image projector is a scanning laser beam projector configured to scan said input pupils with different-wavelength laser beams simultaneously or in interleaved manner.

2. The personal display device according to claim 1, wherein at least two of the in-coupling gratings are positioned between the waveguide layers, the waveguide layer or layers covering the said in-coupling gratings allowing light to pass to said in-coupling gratings.

3. The personal display device according to claim 1, wherein the waveguide layers have different in-plane coverage and each of said in-coupling gratings in located on an outer surface of the element.

4. The personal display device according to claim 1, wherein the input pupils are configured to in-couple light arriving from a single point of convergence.

5. The personal display device according to claim 1, wherein the input pupils are located linearly or triangularly with respect to each other on the plane of the waveguide and do not overlap each other.

6. The personal display device according to claim 1, wherein each of the in-coupling gratings is different with respect to other in-coupling gratings in terms of grating period and/or grating microstructure profile.

7. The device according to claim 1, wherein the image projector is a large-area projector configured to present different-wavelength sub-images to said input pupils simultaneously.

8. The device according to claim 1, wherein the image projector is a large-area projector configured to present different-wavelength sub-images to said input pupils simultaneously.

9. The device according to claim 2, wherein the input pupils are configured to in-couple light arriving from a single point of convergence.

10. The device according to claim 2, wherein the input pupils are located linearly or triangularly with respect to each other on the plane of the waveguide and do not overlap each other.

11. The device according to claim 2, wherein each of the in-coupling gratings is different with respect to other in-coupling gratings in terms of grating period and/or grating microstructure profile.

12. The device according to claim 3, wherein the input pupils are configured to in-couple light arriving from a single point of convergence.

13. The device according to claim 3, wherein the input pupils are located linearly or triangularly with respect to each other on the plane of the waveguide and do not overlap each other.

14. The device according to claim 3, wherein each of the in-coupling gratings is different with respect to other in-coupling gratings in terms of grating period and/or grating microstructure profile.

15. The device according to claim 1, wherein at least two of the in-coupling gratings of the display element are positioned between the waveguide layers, the waveguide layer or layers covering the said in-coupling gratings allowing light to pass to said in-coupling gratings.

16. The device according to claim 15, wherein the image projector is a large-area projector configured to present different-wavelength sub-images to said input pupils simultaneously.

17. The device according to claim 1, wherein the waveguide layers of the display element have different in-plane coverage and each of said in-coupling gratings in located on an outer surface of the element.

18. A personal display device comprising:

an image projector, and a waveguide display element-comprising:

a waveguide comprising at least three waveguide layers stacked on top of each other, diffractive in-coupling gratings associated with each waveguide layer and being displaced with respect to each other in the plane of said layers, the in-coupling gratings forming input pupils for different light wavelength ranges coupled to the waveguide, and a diffractive out-coupling means for coupling light in-coupled through said input pupils and propagating in said layers out of the waveguide such that a polychromatic image is formed, wherein the input pupils are configured to in-couple light arriving at different central angles of each input with respect to each other, and the in-coupling gratings of the input pupils are different so as to make a field-of-view displacement correction for the in-coupled light, the image projector is a laser image projector configured to direct different wavelength ranges to the different input pupils at different angles; and wherein the image projector is a large-area projector configured to present different-wavelength sub-images to said input pupils simultaneously.

19. A personal display device comprising:

an image projector, and a waveguide display element-comprising:

a waveguide comprising at least three waveguide layers stacked on top of each other, diffractive in-coupling gratings associated with each waveguide layer and being displaced with respect to each other in the plane of said layers, the in-coupling gratings forming input pupils for different light wavelength ranges coupled to the waveguide, and a diffractive out-coupling means for coupling light in-coupled through said input pupils and propagating in said layers out of the waveguide such that a polychromatic image is formed, wherein the input pupils are configured to in-couple light arriving at different central angles of each input with respect to each other, and the in-coupling gratings of the input pupils are different so as to make a field-of-view displacement correction for the in-coupled light, wherein the image projector is a large-area projector configured to present different-wavelength sub-images to said input pupils simultaneously.

* * * * *